(12) United States Patent
Sakuraba et al.

(10) Patent No.: US 8,160,239 B2
(45) Date of Patent: Apr. 17, 2012

(54) ECHO CANCELLER AND SPEECH PROCESSING APPARATUS

(75) Inventors: Yohei Sakuraba, Kanagawa (JP); Nobuyuki Kihara, Tokyo (JP); Takayoshi Kawaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1218 days.

(21) Appl. No.: 11/872,936

(22) Filed: Oct. 16, 2007

(65) Prior Publication Data
US 2008/0260172 A1 Oct. 23, 2008

(30) Foreign Application Priority Data
Nov. 10, 2006 (JP) ................ P2006-305794

(51) Int. Cl.
*H04M 9/08* (2006.01)
(52) U.S. Cl. ............... 379/406.06; 379/406.08
(58) Field of Classification Search ............ 379/406.06, 379/406.08
See application file for complete search history.

(56) References Cited
U.S. PATENT DOCUMENTS
2004/0071284 A1* 4/2004 Abutalebi et al. ........ 379/406.08
2006/0018457 A1* 1/2006 Unno et al. .............. 379/388.04
* cited by examiner

*Primary Examiner* — Alexander Jamal
(74) *Attorney, Agent, or Firm* — Finnegan, Henderson, Farabow, Garrett & Dunner, L.L.P.

(57) ABSTRACT

An echo canceller used for hands-free communication systems in which hands-free communication is performed by using a speaker and a microphone is disclosed. The echo canceller includes a step size control unit calculating a step size value in an adaptive filter and an adaptive filter unit estimating an echo component of a feedback path from an input signal to the feedback path by adaptively identifying an impulse response of the feedback path formed by an acoustical coupling and the like of the speaker and the microphone, and subtracting the echo component from an output signal from the feedback path, in which the step size control unit calculates a step size value by using an echo reduction amount defined based on the ratio between the output signal from the feedback path and a residual signal and outputs the value to the adaptive filter unit.

7 Claims, 2 Drawing Sheets

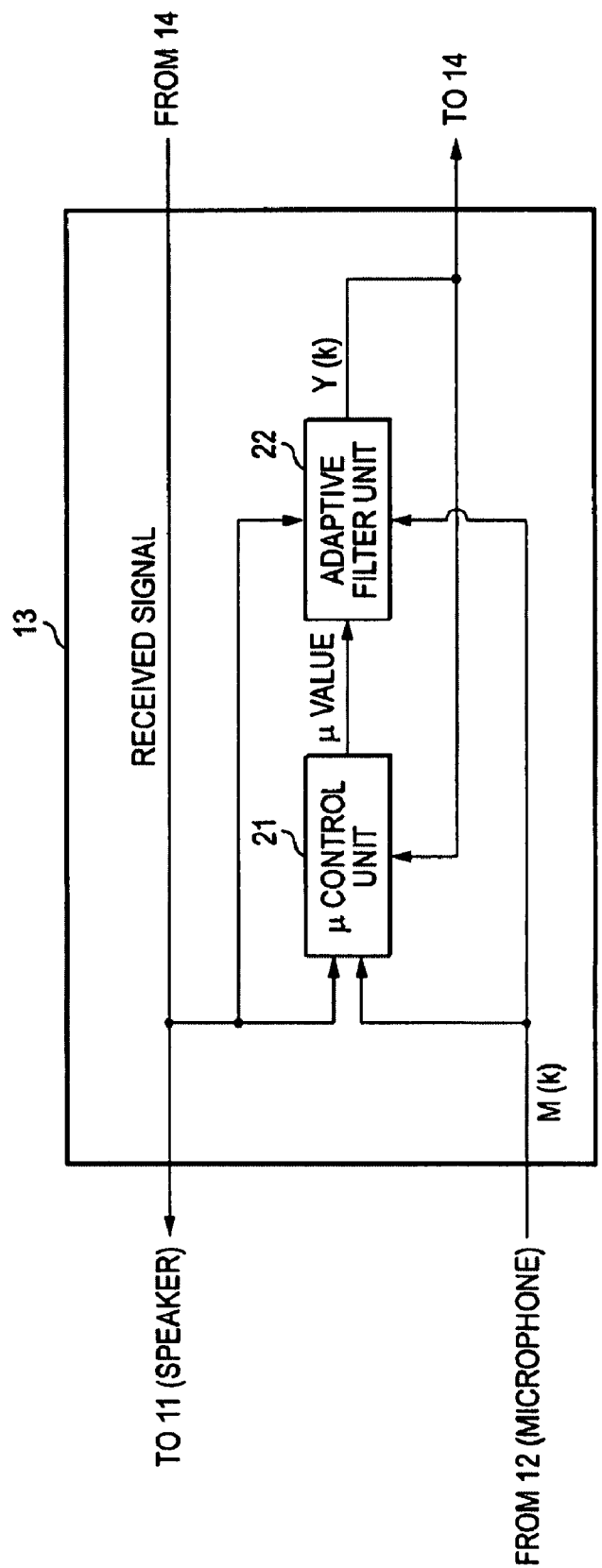

ECHO CANCELLER AND SPEECH PROCESSING APPARATUS

CROSS REFERENCE TO RELATED APPLICATIONS

The present invention contains subject matter related to Japanese Patent Application JP 2006-305794 filed in the Japanese Patent Office on Nov. 10, 2006, the entire contents of which being incorporated herein by reference.

BACKGROUND OF THE INVENTION

1. Field of the Invention

The invention relates to an echo canceller and a speech processing apparatus using the same capable of solving problems such as echo and howling occurring when performing communication in hands-free communication systems such as a hands-free telephone system and a video conference system.

2. Description of the Related Art

In related arts, in the hands-free communication systems such as the video conference system, voice collected by a microphone of a far-end device is transmitted to a near-end device to be outputted from a speaker of the near-end device. The near-end device is also provided with a microphone, and voice of a near-end speaker is transmitted to the far-end device. Therefore, voices outputted from speakers at the far-end side and at the near-end side are respectively inputted into the microphones. When any processing is not performed, the voices are transmitted to correspondent devices again, a phenomenon of "echo" in which speech of oneself is heard from the speaker with a little delay like an echo is caused. When the echo (feedback component) becomes large, it is inputted to the microphone again and loops in the system to cause "howling".

As an apparatus for preventing the echo and the howling as described above, an echo canceller is known. Generally, by using an adaptive filter, an impulse response of a feedback path (echo path) formed by an acoustical coupling of the speaker and the microphone is measured and the impulse response is convoluted with a received signal (reference signal) outputted from the speaker to generate an echo replica, then, the echo replica is subtracted from a voice signal collected by the microphone to remove the echo.

The adaptive filter is well known in related arts, including a processor having a variable coefficient and an adaptive algorithm determining the coefficient at any time, which estimates an echo component of the feedback path (feedback component of the received signal through the feedback path) by adaptively updating the variable filter coefficient by the algorism in which a square mean value of an output signal from a subtractor is minimized. Then, only the echo component included in a transmitting signal is cancelled out by subtracting the echo component estimated by the adaptive filter from the transmitting signal in the subtractor, which prevents components other than the echo collected by the microphone (voice uttered by a speaker with respect to the microphone or surrounding noise) from being damaged.

As one of adaptive algorithms, there is a Normalized LMS algorithm (hereinafter, referred to as "NLMS"). In the NLMS algorithm, the filter coefficient is updated so that a residual signal between a microphone input signal and an estimated echo signal becomes small. At this time, a constant (step size (correction width)) for controlling the size of a correction amount (that is, the speed of convergence) in the repetition at everytime is set. The optimum step size μ(k) of the adaptive filter updated in the NLMS algorithm is shown by the following formula.

$$\mu(k) = \frac{E[|Er(k)|^2]}{E[|S(k)|^2] + E[|Er(k)|^2]} \quad (1)$$

Here, S(k) denotes an interference signal to be inputted to the microphone, Er(k) denotes a residual echo signal not completely removed by the adaptation processing. E[ ] means that a short-time mean is taken and "k" denotes a frequency.

However, it is difficult to actually apply the optimum step size μ(k) as it is. Because the residual echo signal Er(k) included in the residual signal and the interference signal S(k) are difficult to directly observe respective signals, therefore, it is difficult to separate and extract signals.

A method of estimating an amount (ratio) of the residual echo signal in the residual signal by using coherence between the input signal and the residual signal defined by a prescribed calculation formula is proposed (for example, refer to Akira Emura, Yoichi Hada, "adaptive algorithm for deleting stereo echo under noise environment", Collected papers of lectures of the acoustical society of Japan, The acoustical society of Japan, March 2002, 1-Q-5, P645-646 (Non-Patent Document 1)).

SUMMARY OF THE INVENTION

In order to calculate a reliable step size value using the method proposed in the Non-Patent Document 1, it is necessary to take correlation for a certain length of time, however, response is slowed down when finding the optimum step size. Conversely, when taking correlation for a short length of time, the response is fast, however, it is difficult to obtain a reliable coherence value. In the case of unsuitable step size, for example, the small step size, there is a problem such that convergence speed becomes slow because it takes time for correct a tap coefficient of an early impulse response in which variation is large.

It is desirable to calculate an optimum step size value with high accuracy and good response in an echo canceller which is used in hands-free communication systems such as a hands-free telephone system or a video conference system.

According to an embodiment of the invention, there is provided an echo canceller used for hands-free communication systems in which hands-free communication is performed by using a speaker and a microphone, including a step size control unit calculating a step size value in an adaptive filter and an adaptive filter unit estimating an echo component of a feedback path from an input signal to the feedback path by adaptively identifying an impulse response of the feedback path formed by an acoustical coupling and the like of the speaker and the microphone, and subtracting the echo component from an output signal from the feedback path, in which the step size control unit calculates a step size value by using an amount defined based on the ratio between the output signal from the feedback path and a residual signal and outputs the value to the adaptive filter unit.

According to the above configuration, the optimum step size μ value of the adaptive filter is calculated by using on the amount defined based on the ratio between the output signal from the feedback path and the residual signal, therefore, the optimum step size can be calculated with high accuracy with good response by a simple calculation formula.

According to an embodiment of the invention, there is provided a speech processing apparatus used for hands-free communication systems in which hands-free communication is performed by using a speaker and a microphone, including a speaker outputting received voice received from a far-end side, a microphone to which transmitted voice is inputted, and an echo canceller having a step size control unit calculating a step size value in an adaptive filter and an adaptive filter unit estimating an echo component of a feedback path from an input signal to the feedback path by adaptively identifying an impulse response of the feedback path formed by an acoustical coupling and the like of the speaker and the microphone, and subtracting the echo component from an output signal from the feedback path, in which the step size control unit calculates a step size value by using an amount defined based on the ratio between the output signal from the feedback path and a residual signal and outputs the value to the adaptive filter unit.

According to the above configuration, an optimum step size $\mu$ value of the adaptive filter is calculated by using the amount defined based on the ratio between the output signal from the feedback path and the residual signal, therefore, the optimum step size can be calculated with high accuracy and good response by a simple calculation formula. As a result, suitable echo cancellation processing can be performed in the adaptive filter unit.

According to the embodiment of the invention, in the echo canceller used in the hands-free communication system, the optimum step size can be calculated with high accuracy and good response by calculating the step size using the amount defined based on the ratio between the output signal from the feedback path and the residual signal.

In addition, suitable echo cancellation processing is performed by using the speech processing apparatus having the echo canceller, thereby solving the problem such as echo and howling in the hands-free communication systems such as the hands-free telephone system and the video conference system.

BRIEF DESCRIPTION OF THE DRAWINGS

FIG. 2 is a block diagram showing a configuration of a signal processing unit in a speech processing apparatus.

DESCRIPTION OF THE PREFERRED EMBODIMENTS

Figure 1:
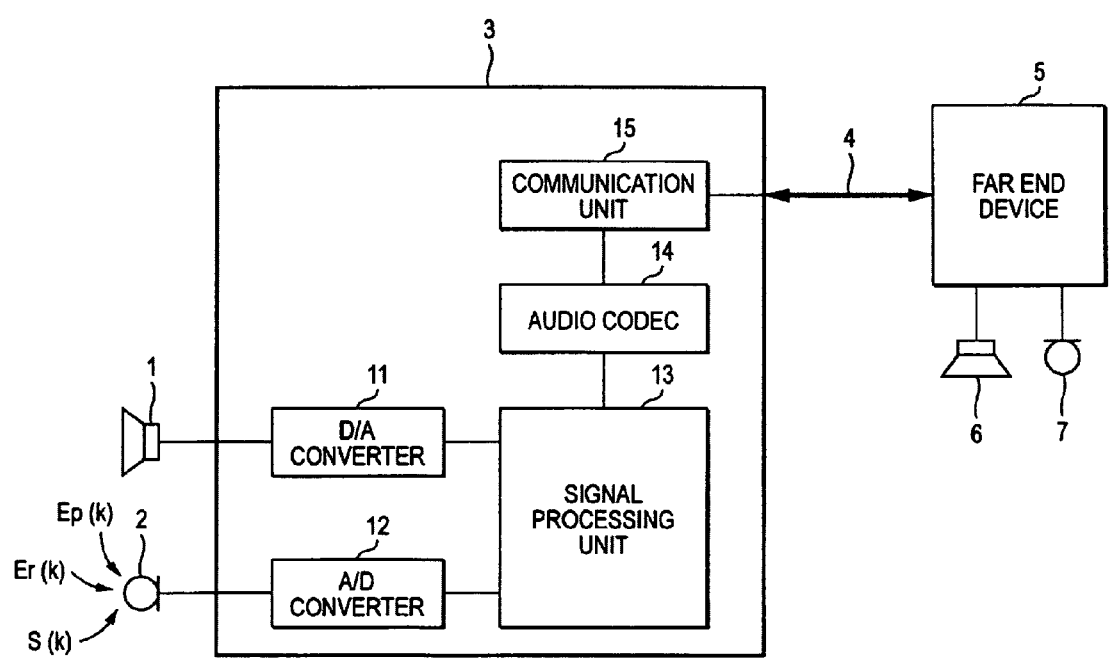
FIG. 1 is a block diagram showing the whole configuration of a hands-free communication system according to an embodiment of the invention.

Hereinafter, an embodiment of the invention will be explained with reference to the drawing.

First, an example of a hands-free communication system to which an echo canceller and a speech processing apparatus according to an embodiment of the invention are applied will be explained. A configuration of a Video conference system as an example of a bidirectional (full-duplex) hands-free communication system is shown in FIG. 1. In FIG. 1, description concerning parts irrelevant to the explanation of the embodiment of the invention such as parts concerning image processing is omitted.

In the video conference system shown in FIG. 1, a near-end device 3 including a speaker 1 outputting received voice and a microphone 2 to which transmitting voice is inputted is connected with a far-end device 5 similarly including a speaker 6 and a microphone 7 by a communication circuit 4, which enables the full-duplex communication bidirectionally. The near-end device 3 and the far-end device 5 are speech processing apparatuses having the same function, and description concerning internal blocks of the far-end device 5 is omitted.

The speaker 1 connected to the near-end device 3 outputs voice collected by the microphone connected to the far-end device 5 and processed by the near-end device 3. The microphone 2 connected to the near-end device 3 collects speech voice of video conference attendees at the near-end side as well as collects voice superimposed on the speech voice outputted from the speaker 1 through the air.

A D/A (digital/analog) converter 11 converts digital voice data processed at a signal processing unit 13 into analog voice data. The analog voice data processed at the D/A converter is suitably amplified at an amplifier (not shown) to be outputted from the speaker 1.

An A/D (analog/digital) converter 12 converts voice (analog voice data) collected by the microphone 2 into digital voice data. At this time, voice (analog voice data) which has been suitably amplified by an amplifier (not shown) is inputted in the A/D converter 12.

The signal processing unit 13 includes, for example, a digital signal processor (DSP), performing processing of converting input and output voice data to desired data. The processing will be explained in detail later.

An audio codec 14 encodes voice data based on microphone input transmitted from the signal processing unit 13 into a code standardized in the video conference system as well as decodes encoded voice data from the far-end device 5 transmitted from a communication unit 15 and transmits data to the signal processing unit 13.

The communication unit 15 transmits and receives input and output data of encoded voice with respect to the far-end device 5 through the communication circuit 4 by digital data communication. As the communication circuit 4, a general digital communication circuit such as Ethernet (Trademark) is used.

FIG. 2 is a block diagram showing an internal configuration of the signal processing unit 13. Also in FIG. 2, description concerning parts irrelevant to the explanation of the embodiment of the invention is omitted.

The signal processing unit 13 functions as an echo canceller, configured to include a $\mu$ control unit 21 and an adaptive filter unit 22. In the embodiment, a Normalized LMS algorithm (hereinafter, referred to as "NLMS") is applied as an adaptive algorithm. In the NLMS algorithm, a filter coefficient is updated so that a residual signal between a microphone input signal and an estimated echo signal becomes small.

The $\mu$ control unit 21 functions as a step size control unit, calculating a $\mu$ value as a constant (step size (correction width)) for controlling the size of a correction amount (that is, the speed of convergence) in the repetition at every time in the adaptive filter unit 22, and outputting the result to the adaptive filter unit 22.

The adaptive filter unit 22 includes an adaptive filter function in which an impulse response of a feed back path (echo path) formed by an acoustical coupling between the speaker and the microphone is adaptively identified according to the optimum step size ($\mu$ value) from the $\mu$ control unit 21 and an echo component of the feedback path is estimated from an input signal (received signal) to the feedback path and a calculation function in which the echo component estimated by the adaptive filter is subtracted from an output signal (microphone input signal) from the feedback path. The adaptation is gradually performed by a sampling frequency 48000 Hz.

The adaptive filter unit 22 includes a processor having a variable coefficient and an algorism determining the coefficient at any time, estimating the echo component of the feedback path (feedback component of the received signal through the feedback path) by adaptively updating the variable filter coefficient by the algorism, that is the NLMS algorithm in the embodiment, in which a square mean value of an output signal from a subtracter in the adaptive filter unit 22 is minimized. Then, the echo component included in the transmitting signal is removed by subtracting the echo component estimated by the adaptive filter from the transmitting signal in the subtracter, which prevents components other than the echo collected by the microphone (voice uttered by a speaker with respect to the microphone or surrounding noise) from being damaged.

The voice signal (received signal) transmitted from the audio codec 14 to the signal processing unit 13 is not only outputted from the speaker 1 directly but also transmitted to the μ control unit 21 and the adaptive filter 22. The voice signal (microphone input signal) transmitted from the microphone 2 to the signal processing unit 13 through the A/D converter 12 is transmitted to the μ control unit 21 and the adaptive filter 22. In the μ control unit 21, the optimum step size (μ value) is calculated from the microphone input signal transmitted from the A/D converter 12 and the received signal or the voice signal after receiving the echo cancellation processing which is transmitted from the adaptive filter 22 to be outputted to the adaptive filter 22. In the adaptive filter 22, adaptation processing is performed based on the μ value supplied from the μ control unit 21, and the voice signal to which the echo cancellation processing has been performed is transmitted from the signal processing unit 13 to the audio codec 14.

In a status in which noise and transmitted voice are also collected, signals other than the echo operate as interference signals, therefore, the estimation of the filter coefficient in the adaptive filter becomes unstable and output sometimes diverges. Under such status, a method of using echo return loss enhancement (hereinafter, referred to as ERLE) was devised in the embodiment of the invention as a method of finding the optimum step size, which will be described as follows. The ERLE indicates to what degree the echo was removed in the adaptive filter 21 (echo reduction amount).

When an interference signal to be inputted to the microphone 2 is $S(k)$, an echo signal estimated by the adaptive filter is $Ep(k)$, and a residual echo signal not completely removed by the adaptive filter is $Er(k)$, a voice signal $M(k)$ inputted into the microphone 2 and an echo cancellation output signal (residual signal) outputted from the adaptive filter unit 21 are represented by the following formulas respectively. "k" denotes a frequency.

$$M(k) = S(k) + Er(k) + Ep(k) \qquad (2)$$

$$Y(k) = S(k) + Er(k) \qquad (3)$$

The echo reduction amount ERLE is the amount defined by using a ratio of amplitude between the microphone input signal $M(k)$ and the residual signal $Y(k)$, and represented by the following formula. A unit is [dB].

$$ERLE = 20\log\left(\frac{|M(k)|}{|Y(k)|}\right) \qquad (4)$$

In the embodiment, a ratio of squares of power of the residual signal $Y(k)$ and the microphone input signal $M(k)$ is expressed as the echo reduction amount ERLE by the following formula (5).

$$ERLE = \frac{E[|S(k)|^2] + E[|Er(k)|^2]}{E[|S(k)|^2] + E[|Er(k)|^2] + E[|Ep(k)|^2]} \qquad (5)$$

$E[\ ]$ means that the short-time mean is taken.

When the short-time mean, the power and the square are omitted and $E[|S(k)|^2]$ is denoted by "S", $E[|Er(k)|^2]$ is denoted by "Er" and $E[|Ep(k)|^2]$ is denoted by "Ep", the formula (5) can be expressed as follows.

$$ERLE = S + Er/S + Er + Ep \qquad (6)$$

The echo reduction amount calculated based on the power of the short-time mean of respective signals is referred to as "short-time ERLE" and the amount of taking the long-time mean by multiplying the "short-time ERLE" by a time constant is referred to as "long-time ERLE". In the case that measuring time is long to a certain degree such as 10 seconds, there are much time in which conversation is not performed, and the interference signal $S(k)$ becomes approximately zero when averaged. In this case, the effect of the interference signal $S(k)$ in the long-time ERLE is cancelled and the ERLE comes close to the following formula.

$$\overline{ERLE} = \frac{Er}{Er + Ep} \qquad (7)$$

Here, the optimum step size $\mu(k)$ of the formula (1) is converted as shown by the following formulas (8a) to (8e) by using the short-time ERLE of the formula (6) and the long-time ERLE of the formula (7).

$$\mu(k) = \frac{E[|Er(k)|^2]}{E[|S(k)|^2] + E[|Er(k)|^2]} \qquad (8a)$$

$$= \frac{Er}{S + Er} \qquad (8b)$$

$$= \frac{\dfrac{Ep}{Er+Ep} \cdot \dfrac{Ep}{S+Er+Ep}}{\dfrac{S+Er}{S+Er+Ep} \cdot \dfrac{Ep}{Er+Ep}} \qquad (8c)$$

$$= \frac{\dfrac{Er}{Er+Ep} \cdot \left(1 - \dfrac{S+Er}{S+Er+Ep}\right)}{\dfrac{S+Er}{S+Er+Ep} \cdot \left(1 - \dfrac{Er}{Er+Ep}\right)} \qquad (8d)$$

$$= \frac{\overline{ERLE} \cdot (1 - ERLE)}{ERLE \cdot (1 - \overline{ERLE})} \qquad (8e)$$

From the above, it is found that the optimum step size $\mu(k)$ in the NLMS algorithm can be calculated by using the short-time ERLE and the long-time ERLE without directly calculating the interference signal $S(k)$ and the residual echo signal $Er(k)$. The μ control unit 21 transmits the optimum step size $\mu(k)$ calculated by the above calculation formula to the adaptive filter unit 22. The adaptive filter unit 22 determines a filter coefficient based on the optimum step size $\mu(k)$ and performs the echo cancellation processing, then, transmits the voice signal $Y(k)$ which received the echo cancellation processing to the audio codec 14. Then, the voice signal which received the echo cancellation processing is transmitted from the near-end device 3 to the far-end device 5 to be outputted from the speaker 6.

According to the above embodiment, the optimum step size μ value of the adaptive filter can be calculated with high accuracy based on the echo reduction amount ERLE as well as with good response by the relatively simple calculation in the μ control unit 21. That is, even when the interference signal Er(k) is included in the residual signal, the optimum step size μ(k) in the NLMS algorithm can be represented by using the echo reduction amount ERLE, therefore, the update of the adaptive filter in the optimum step size becomes possible. As a result, the adaptive filter unit 22 can determine the filter coefficient based on the optimum step size μ value and can perform suitable echo cancellation processing. Accordingly, the echo problem in the hands-free telephone and the video conference is solved and a user of the far-end device 5 can perform hands-free communication by voice in which the echo is cancelled suitably. Similarly, the far-end device 5 is provided with the same function as the signal processing unit 13 of the near-end device 3, and a user of the near-end device 3 can perform the hands-free communication by voice in which the echo is cancelled suitably.

It is also preferable to apply a configuration in which an echo suppression unit is provided at the later stage of the adaptive filter unit 22 and echo suppression processing is performed to residual echo which has not been completely removed in the echo cancellation processing in the adaptive filter unit 22.

When the optimum step size is calculated by averaging in the whole frequency band of a voice band, the optimum filter coefficient at each frequency is not selected at the adaptive filter unit 22, and echo cancellation processing at each frequency band is not performed suitably. Therefore, as a modification example of the embodiment, it is proposed that respective optimum step sizes μ values with respect to adaptation processing according to respective frequency bands of the microphone input signal are calculated based on the echo reduction amount ERLE with high accuracy and with good response.

For example, the frequency band [Hz] is divided into 0<k≦100, 100<k≦200, 200<k≦300 . . . and so on. In the control unit 21, the optimum step sizes μ values are calculated based on the echo reduction amount ERLE according to these frequency bands, and the adaptive filter unit 22 determines filter coefficients according to respective frequency bands based on respective optimum step sizes μ values and calculates echo components according to the frequency bands to perform the echo cancellation processing. Then, the results are transmitted to the audio codec 14. According to the processing, the meticulous echo cancellation processing becomes possible by the optimum step sizes calculated according to the frequency bands, not the uniform step size in the whole frequency band.

Additionally, in a speech processing apparatus in which the echo cancellation processing is performed by dividing the voice band as another modification example of the embodiment, the adaptation processing by the optimum step size μ value calculated based on the echo reduction amount ERLE is performed with respect to a frequency component which has a strong effect on sound quality, and the adaptation processing by a prescribed step size using a voice switch and the like is performed with respect to a frequency component which has little effect on sound quality. The voice switch is a switching means for switching operation or non-operation of calculation of the optimum step size. According to such configuration, the hands-free communication system can be designed in consideration of both sound quality and the calculation amount.

Moreover, it is preferable to apply a configuration as further another modification example of the embodiment, in which the optimum step sizes are calculated according to frequency bands with respect to a specific frequency component in the μ control unit 21 and a certain step size is outputted to the adaptive filter unit 22 with respect to other frequency components. Accordingly, the suitable step sizes μ values are set according to the frequency bands in the specific frequency components and more meticulous echo cancellation processing becomes possible in the adaptive filter unit 22.

The invention is not limited to the above embodiments and it goes without saying that various modifications and alterations are possible in a range not departing from the gist of the invention such that functions of the μ control unit 21 and the adaptive filter unit 22 are provided in a processing unit in which they are integrally configured.

What is claimed is:

1. An echo canceller used for hands-free communication systems in which hands-free communication is performed by using a speaker and a microphone, comprising:
    a step size control unit calculating a step size value in an adaptive filter; and
    an adaptive filter unit estimating an echo component of a feedback path from an input signal to the feedback path by adaptively identifying an impulse response and the feedback path formed by an acoustical coupling of the speaker and the microphone, and subtracting the echo component from an output signal from the feedback path, and
    wherein the step size control unit calculates a step size value by using an echo reduction amount defined based on the ratio between the output signal from the feedback path and a residual signal including a residual echo signal, and
    wherein the step size control unit outputs the value to the adaptive filter unit.

2. The echo canceller according to claim 1,
    wherein, when an interference signal inputted to the feedback path is S(k), the residual echo signal is Er(k), a short-time mean is E, and a frequency is k, a optimum filter size μ(k) updated in a NLMS algorithm is represented by $$\mu(k)=E[|Er(k)|^2]/\{E[|S(k)|^2]+E[|Er(k)|^2]\}, \text{ and}$$

wherein the step size control unit calculates the step size μ(k) by using an echo reduction amount (short-time ERLE) calculated based on power of the short-time mean and an echo reduction amount (long-time ERLE) calculated based on power of a long-time mean.

3. The echo canceller according to claim 2,
    wherein, when an echo signal estimated in the adaptive filter unit is Ep(k), a ratio of squares of power of the output signal from the feedback path and the residual signal is ERLE, an ERLE calculated based on the power of the short-time mean is represented by $$(\text{short-time } ERLE)=\{E[|S(k)|^2]+E[|Er(k)|^2]\}/\{E[|S(k)|^2+E[|Er(k)|^2]+E|Ep(k)|^2]\}, \text{ and}$$

an ERLE calculated based on the power of the long-time mean is represented by $$(\text{long-time } ERLE)=\{E[|Er(k)|^2\}/\{E[|Er(k)|^2]+E|Ep(k)|^2]\}, \text{ and}$$

the step size μ(k) is represented by $$\mu(k)=(\text{long time } ERLE)\cdot\{1-(\text{short-time } ERLE)\}/[(\text{short-time } ERLE)\cdot\{1-(\text{long-time } ERLE)\}].$$

4. The echo canceller according to any one of claims 1 to 3, wherein the step size control unit calculates step sizes according to respective frequency bands to supply them to the adaptive filter unit.

5. The echo canceller according to any one of claims 1 to 3, wherein the step size control unit calculates a step size with respect to a specific frequency component, and supplies a prescribed step size with respect to other frequency components to the adaptive filter unit.

6. The echo canceller according to any one of claims 1 to 3, wherein the step size control unit calculates step sizes according to respective frequency bands with respect to a specific frequency component, and supplies a prescribed step size with respect to other frequency components to the adaptive filter unit.

7. A speech processing apparatus used for hands-free communication systems in which hands-free communication is performed by using a speaker and a microphone; comprising;
 a speaker outputting received voice received from a far-end side;
 a microphone to which transmitted voice is inputted; and
 an echo canceller including a step size control unit calculating a step size value in an adaptive filter and
 an adaptive filter unit estimating an echo component of a feedback path from an input signal to the feedback path by adaptively identifying an impulse response of the feedback path formed by an acoustical coupling and the speaker and the microphone, and subtracting the echo component from an output signal from the feedback path, and
wherein the step size control unit calculates a step size value by using an amount defined based on the ratio between the output signal from the feedback path and a residual signal including a residual echo signal, and
wherein the step size control unit outputs the value to the adaptive filter unit.

* * * * *